US00RE38069E

(19) United States
(12) Reissued Patent
Posa

(10) Patent Number: US RE38,069 E
(45) Date of Reissued Patent: Apr. 8, 2003

(54) ELECTRICAL SWITCHED LOAD RELOCATION APPARATUS

(76) Inventor: John G. Posa, 1204 Harbrooke Ave., Ann Arbor, MI (US) 48103

(21) Appl. No.: 09/532,850

(22) Filed: Mar. 21, 2000

Related U.S. Patent Documents

Reissue of:
(64) Patent No.: 5,731,664
Issued: Mar. 24, 1998
Appl. No.: 08/629,412
Filed: Apr. 8, 1996

(51) Int. Cl.[7] ..... H04B 10/00
(52) U.S. Cl. ..... 315/194; 315/DIG. 4; 315/158; 315/291; 315/194; 340/825.72; 367/903; 307/140; 307/38
(58) Field of Search ..... 367/903; 315/291, 315/149, 194, DIG. 4, 158; 340/825.72; 307/116

(56) References Cited

U.S. PATENT DOCUMENTS

| | | | | | |
|---|---|---|---|---|---|
| 3,590,271 | A | * | 6/1971 | Peters | |
| 4,223,301 | A | * | 9/1980 | Grimes et al. | 340/500 |
| 4,334,171 | A | * | 6/1982 | Parman et al. | 315/199 |
| 4,418,333 | A | * | 11/1983 | Schwarzbach et al. | |
| 4,476,554 | A | * | 10/1984 | Smith et al. | 367/197 |
| 4,482,844 | A | * | 11/1984 | Schweer et al. | 315/194 |
| 4,654,541 | A | * | 3/1987 | Angott | 307/147 |
| 4,695,739 | A | * | 9/1987 | Pierce | 307/141 |
| 5,099,193 | A | * | 3/1992 | Moseley et al. | 323/324 |
| 5,166,482 | A | * | 11/1992 | Li | 307/117 |
| 5,239,205 | A | * | 8/1993 | Hoffman et al. | |
| 5,598,039 | A | * | 1/1997 | Weber | 307/38 |

OTHER PUBLICATIONS

Leviton Manufacturing Co., Inc.: *Decora Home Control Technical Manual,* Mar. 1994, Leviton Manufacturing Co. Inc. pp. 1–39.*

* cited by examiner

*Primary Examiner*—Arnold Kinkead
(74) *Attorney, Agent, or Firm*—Gifford, Krass, Groh, Sprinkle, Anderson & Citkowski, PC

(57) ABSTRACT

A wireless transmitter associated with a switched electrical connection and a receiver therefor, adapted for connection in an electrical path between the source of power and a load, enables the load to be controlled by the switch originally used to control the switched electrical connection. The communication between the transmitter and receiver may be realized only when power is applied or removed from the switched connection, or, alternatively, this communication may be carried out on a per-cycle basis, enabling a phase-delay type of control over the relocated load, including dimming of the relocated load without requiring modification to a previously installed dimmer switch. The signal radiated by the transmitter may be of acoustic or electromagnetic origin, though IR transmissions are used in the preferred embodiment. The transmitter module includes means for making electrical contact to a switched electrical connection, and means for transmitting a wireless signal in response to the application of electrical Dower to the switched electrical connection, and the receiver module includes means for making electrical contact to a source of electrical power, means for making contact to an electrical load, and means for routing electrical power from the source to the load in response to the signal transmitted by the transmitter module. Exposed wires, plug- and socket-type connections may be utilized as alternatives depending upon physical implementation.

35 Claims, 3 Drawing Sheets

FIG-3A
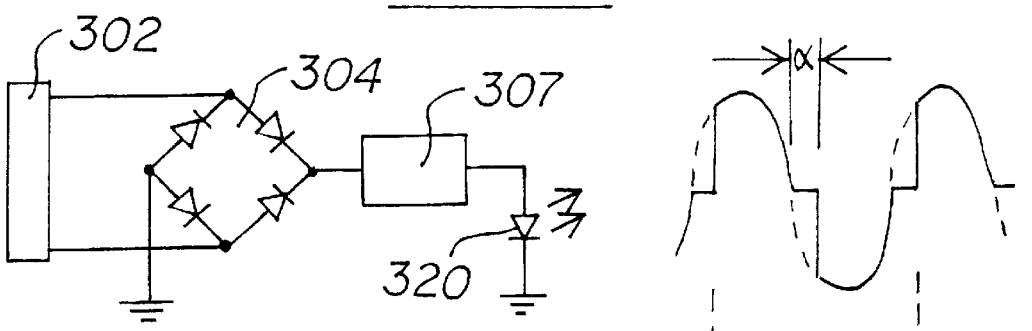
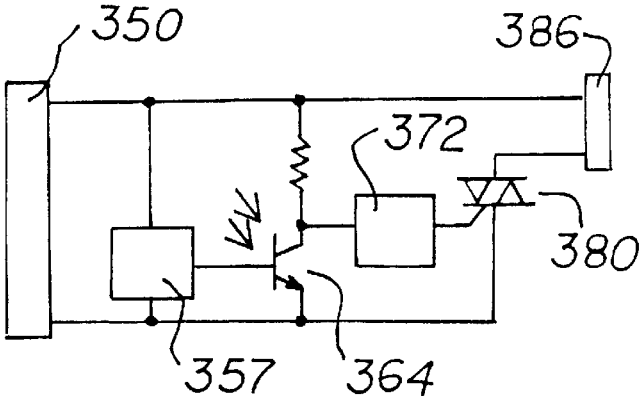
FIG-3B

ELECTRICAL SWITCHED LOAD RELOCATION APPARATUS

Matter enclosed in heavy brackets [ ] appears in the original patent but forms no part of this reissue specification; matter printed in italics indicates the additions made by reissue.

FIELD OF THE INVENTION

The present invention relates generally to electrical switching and control, and, more particularly, to apparatus enabling an electrically switched load, including a load operated using a dimmer function, to be relocated to another location where power is available.

BACKGROUND OF THE INVENTION

The rooms in many homes are illuminated with ceiling lights, which are efficient in terms of coverage, but often cast harsh shadows or make the room seem small. Often times rooms can be made more appealing with floor or table lamps used to create particular functional areas or moods. Accordingly, some homes are built in such a way than when one enters a room and turns on the lightswitch, a wall outlet is powered at the same time or instead of a ceiling fixture, enabling the lightswitch to control a floor or table lamp for a higher degree of ambiance.

Unless the structure is already wired to switch a wall outlet upon entry into a particular room, the options for utilizing floor or table lamps instead of overhead fixtures are limited or difficult to implement. Often the resident simply turns on the overhead lamp, and uses the light produced to switch on one or more floor or table lamps, then, using the light which they provide, go back and turn off the overhead lamp. Although this is inconvenient, it produces the desired effect. Alternatively, the homeowner can have particular rooms rewired for switched wall outlets, but this necessitates a great degree of inconvenience and expense. Thus, an economical, easily implemented mechanism for relocating a switched electrical connection, such as a ceiling outlet, to a wall outlet, would therefore be welcomed by numerous homeowners, home builders, architects, interior decorators, and others.

SUMMARY OF THE INVENTION

The present invention provides a wireless transmitter associated with a switched electrical connection, and a receiver adapted for connection in an electrical path between the source of power and a load, enabling the load to be controlled by the switch originally used to control the switched electrical connection. The communication between the transmitter and receiver may be realized only when power is applied or removed from the switched connection, or, alternatively, this communication may be carried out on a per-cycle basis, enabling a phase-delay type of control over the relocated load, including dimming of the relocated load without requiring modification to a previously installed dimmer switch.

Electrical switched-load relocation apparatus according to the invention includes a transmitter module in electrical communication with the switched electrical connection, the transmitter module being operative to radiate a signal when electrical power is applied to tile connection, and a receive module disposed in an electrical path between a source of electrical power and an electrical load, the receiver being operative to route power from the source to the load in response to the signal radiated by the transmitter. The signal radiated by the transmitter may be of acoustic or electromagnetic origin.

More particularly, the transmitter module includes means for making electrical contact to a switched electrical connection, and means for transmitting a wireless signal in response to the application of electrical power to the switched electrical connection, and the receiver module includes means for making electrical contact to a source of electrical power, means for making contact to an electrical load, and means for routing electrical power from the source to the load in response to the signal transmitted by the transmitter module. The means for making electrical contact to the switched electrical connection may take on many forms, including a set of exposed wires, a plug to be inserted into a switched electrical outlet, or a threaded base to be inserted into a switched electrical socket. The means for making electrical contact to a source of electrical power may adopt many forms as well, including a see of exposed wires, a plug to be inserted into an electrical outlet, a threaded base to be inserted into an electrical socket. The means for making contact to an electrical load may includes an electrical outlet into which a load having a plug may be inserted or an electrical socket into which a load having a threaded base may be installed.

BRIEF DESCRIPTION OF THE DRAWINGS

FIG. 3A is an electrical block diagram of a transmitter module capable of communicating a control signal on a per-cycle basis; and FIG. 3B is an electrical block diagram of a receiver module responsive to the transmitter module of FIG. 3A, thereby accommodating a relocated load which benefits from a dimmer function.

DETAILED DESCRIPTION OF THE PREFERRED EMBODIMENT

The present invention provides a wireless transmitter associated with a switched electrical connection, and a receiver adapted for connection in an electrical path between the source of power and a load, enabling the load to be controlled by the switched originally used to control the switched electrical connection. The communication between the transmitter and receiver may be realized only when power is applied or removed from the switched connection, or, alternatively, such communication may be carried out on a per-cycle basis, enabling a phase-delay type of control over the relocated load, including dimming of the relocated load without requiring modification to a previously installed dimmer switch. Various techniques will further be disclosed to ensure that a particular transmitter reliably activates only one or a given set of receivers, including physical directioning and encoded addressing schemes between matched transmitters and receivers.

The signal between the transmitter and receiver may be optical, acoustical or RF in nature, though, in the preferred embodiment and for reasons of reduced cost and component availability, infrared (IR) transmissions are used. However, it should be clear to one of skill in the art that the IR transmitters and receivers of this invention may be replaced straightforwardly with other wireless communication forms, such as acoustic, including supersonic, RF, and so forth. The choice to use infrared is primarily based upon the availability of inexpensive transducers, both as transmitters and receivers. Realization of the invention utilizing acoustical transducers or RF transmitters and receivers, though possible, would be more expensive to implement or present other hurdles, such as the need for FCC certification, and so forth.

Figure 1:
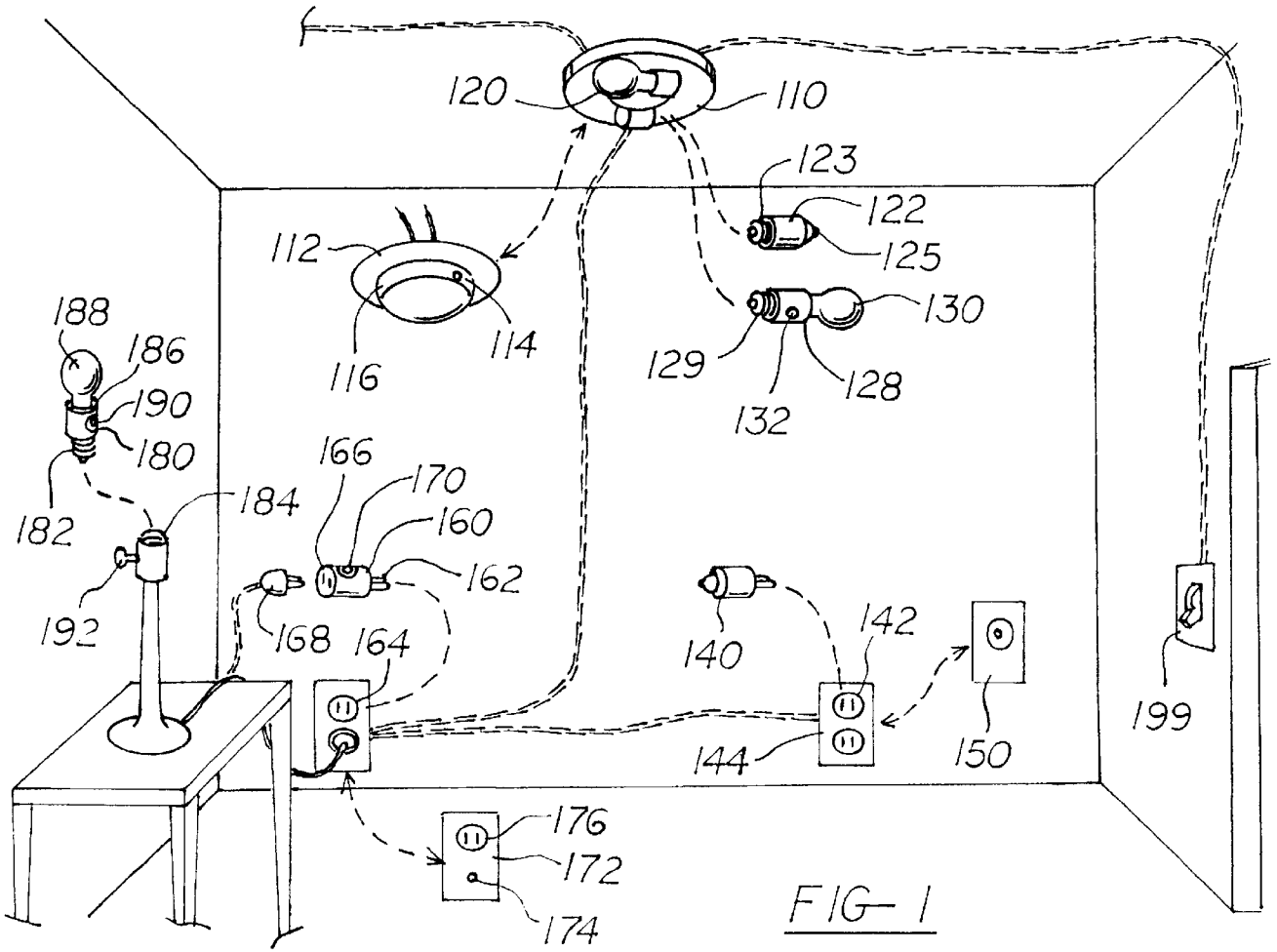
FIG. 1 is a perspective view of a portion of a room illustrating physical implementations which the present invention may assume.

FIG. 1 shows a number of ways in which the invention may be physically implemented to meet the needs of a wide range of applications. The transmitter module may be installed either in a ceiling fixture or in an existing switched wall outlet or lamp socket using a variety of convenient installation mechanisms. With regard to ceiling installation, a previously installed ceiling light fixture 110 may simply be removed and a new fixture 112 according to he invention including an infrared transmitter LED 114 may be installed in its place. The infrared LED 114 is preferably supported on a rotating turret 116, enabling the device to be "aimed" no the location of a particular receiver.

As one alternate to the replacement of the ceiling fixture 110, the fixture may be kept in place, bum with one or more of the bulbs 120 being removed to install instead, one or more transmitter modules 122, each having a threaded base end 123 and a transmitter end 125. As a further alternative, a module 128 according to the invention may include a threaded end 129 and a threaded socket into which a bulb 130 may be inserted. In this case, the module 128 may have one or more transmitter boards 132 spaced about the outer side wall of the device between the threaded base 129 and socket containing bulb 130. Utilizing this particular embodiment, when the ceiling fixture is electrically activated, both the transmitter within module 128 and bulb 130 will be powered, enabling a remote load to be switched simultaneously with the bulb 130. As yet a further alternative implementation of this particular embodiment, the receiver, discussed below, may simply be designed to be responsive to the light produced by a "master" bulb, particularly incandescent, enabling the remote load to function as a "slave" without the need for a transmitter of specialized radiation.

Instead of ceiling installation, the transmitter module according to the invention may be adapted for wall installation, either as a plug-in type unit 140, which simply plugs into a standard outlet 142 shrouded with a cover plate 144. Alternatively, the receptacle containing outlet 142 and cover plate 144 may be removed, and a transmitter module 150 may instead be installed for a more permanent replacement of the receptacle. Such a permanent replacement may be advantageous, for example, in using the invention to relocate a switched outlet to a different outlet less accessible to small children.

The receiver module of this invention may also take on various physical configurations, including a module 160 having an end with prongs 162 adapted for installation into a standard receptacle 164, and a second end 126 into which a plug 168 may be inserted. The actual receiver transducer 170 is shown exposed on an upper surface of the body of the module 160. As with the transmitter module, as an alternate to a plug-in type of unit the receptacle assembly and cover plate may be removed and replaced with a unit such as that depicted at 172 having a receiver transducer 174 which controls a receptacle 176 in accordance with a signal transmitted by the receiver, as will be discussed below.

Other alternative physical configurations for the receiver further exist, including that depicted by module 180, which has a threaded end 182 adapted to screw into a fixture 184 such as a lamp fixture, and another end 186 having a socket into which a load may be installed, such as lightbulb 188. In this case, one or more receiver transducers 190 would be positioned outside the body of the module 180, as shown. With this particular configuration, and using a lamp as an example, the lamp would be plugged into the wall and turned on with switch 192 with the module 180 and bulb 188 in place. Although the lamp is turned on with switch 192, the bulb will remain off until controlled in accordance with the signal from one or more of the transmitters described herein.

In the preferred embodiment, the transmitter takes the form of a screw-in type unit such as module 122, and the receiver takes the form of module such as 160 having male and female prongs. This is the preferred embodiment since it enables the consumer to very easily install both the transmitter and receiver without the use of any specialized tools, and without the need to remove power, for example, by opening a circuit breaker. Using this physical configuration as an example, the operation of the invention is briefly described as follows. When an individual enters the room and activates the switch 199, power is applied to the overhead outlet. Assuming all ceiling-mounted lights have been removed, and that aa lease one module 122 has been inserted into a socket associated with the ceiling fixture, the switched power is not applied to a large load, but is instead applied to the transmitter module electronics contained within the unit 122. Application of power to this unit causes a wireless signal to be radiated through transducer 125 which is sensed by pick up 170 and the module 160. Assuming the module 160 has been inserted into a standard wall outlet wherein power is continuously available, the electronics contained in the module 160 is continuously ready to receive such a transmitted signal. Assuming a lamp having a bulb inserted there into and having been previously switched on, is plugged into the end 166 of the module 160, electronics within the module 160 further route power from the outlet to the line cord of the lamp through receiver module electronics, in response to the received signal, causing the lamp to turn on. Thus, a switched load, in this case, a lightbulb, has been effectively relocated using the invention. It should be understood than any type of electrical load may be relocated in a similar manner utilizing the appropriate set of transmitter and receiver modules.

As with physical configuration, the electronics associated with both the transmitter and receiver modules of this invention may also take on various electrical circuit configurations, depending upon whether a single pulse or signal is transmitted only during actual switching by a user, or whether signal transmission occurs on a per-cycle basis, thereby accommodating the relocation of a phase delay load such as a light dimmer. Additionally, order to ensure that a transmitter in one area does not falsely trigger the wrong receiver, mechanical and/or electrical or optical considerations may be added to ensure proper receiver addressing and/or activation.

Figure 2A:
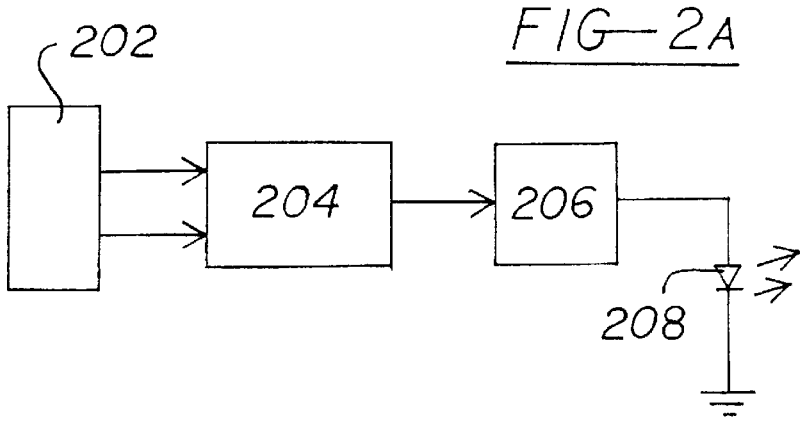
FIG. 2A is an electrical block diagram of a transmitter module according to the invention which does not function on a per-cycle basis.

FIG. 2 shows a block diagram of a transmitter/receiver which is not based upon per-cycle communication but, instead, involves a single communication when the load is switched on and a single communication when the load is switched off. A transmitter module respecting this embodiment is shown in FIG. 2A, having means 202 adapted for connection to a switched connection as described above with regard to physical configurations, a power supply 204 and a pulse generator 206 driving, in this case, an infrared light emitting diode 208. While operate the transmitter so as to continuously output a signal or stream of pulses from the IR diode 208 using pulse generator 206, to conserve power and prolong the life of the components involved, it may be advantageous to send out a single pulse or stream of pulses when the connection is initially switched, and a second pulse or stream of pulses when turned off. Thus, in terms of circuitry power supply 204 may be implemented using a variety of circuit techniques familiar to one of skill in electrical engineering, depending upon the sophistication of pulse generator 206. As examples, in the event pulse generator 206 is called upon to transmit but a single pulse upon power-up and power-down, power supply 204 may not provide direct current continuously in a traditional sense, but rather, may simply include appropriate capacitors and triggers such as zener diodes and/or power transistors to activate the transducer actually responsible for pulse transmission. In this simplified case, then, the functions of power supply 204 and pulse generator 206 may effectively be combined.

If, however, pulse generator 206 is used to generate a series of pulses and, in particular, if such pulses are to be encoded in some fashion as described below, pulse generator 206 may be much more sophisticated and may include a programmable device such as a single-chip microcomputer, or the like. In this case, then, power supply 204 may be more traditional in that it will generate a continuous DC. In preferred implementations of this embodiment, in lieu of more expensive components such as transformers, a single-chip voltage regulator including power MOSFETs is utilized to facilitate direct connection to the AC line.

As mentioned, if a stream of pulses are utilized, upon initialization, such pulses may also conveniently be used to encode an address for a particular receiver. In this case the circuitry involved would be somewhat more sophisticated, and may include the use of a single-chip microcomputer of conventional design having one or more inputs such as switches to encode address programming. Although not shown, since the transmitter is associated with a switched connection, circuitry may further be provided to delay the activation of the various circuits shown in the figures until the voltage level from the power supply 204 has stabilized.

Figure 2B:
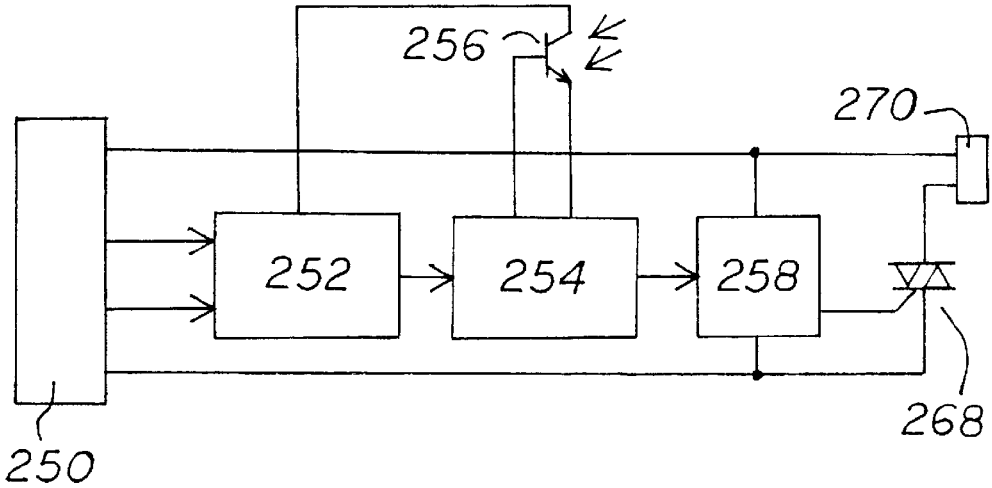
FIG. 2B is an electrical block diagram of a receiver module responsive to the transmitter depicted in FIG. 2A.

FIG. 2B illustrates one embodiment of a receiver operative to activate a load in accordance with a signal radiated by the transmitter of FIG. 2A. Broadly, the receiver of FIG. 2B includes means 250 for making connection to a source of power as described earlier with reference to FIG. 1, and a power supply 252. As with the power supply 204 associated with the transmitter of FIG. 2A, it will be appreciated by those involved with circuit design that single-chip power supplies are now available which may make direct connection no higher-voltage input sources, including such direct connection no an AC line.

The output of the power supply 252 is fed to a receiver circuit 254 coupled to an infrared detector 256 and the output of the receiver 254 is used to drive an AC switch such as a triac 268 through a gating circuit 258. The output of the switch 268 is further coupled to means 270 for making connection to a load, which may be of any of the types described earlier with reference to FIG. 1. Note that since the switched load is in parallel with the power supply 252, power will remain imposed upon the supply even in the event that switch 268 has routed power to the load through means 270, thereby enabling the receiver 254 to continue to watch for an "off" pulse from the transmitter even while the load is "on".

The receiver 254 may be implemented in various ways, depending upon whether the transmitter utilizes single on/off activation or a stream of pulses. In the event of a single-pulse approach, the receiver 254 will preferably include some means for alternating between on and off activation, such as a simple flip flop gated by the receipt of a transmitted IR pulse. In the event that a data stream is utilized with receiver addressing, functional block 254 will represent more sophisticated logic circuitry such as a single-chip microcomputer of conventional design, including input means for setting a correct address for the receipt of an appropriate pulse train.

FIG. 3 illustrates the preferred embodiment of the invention, wherein the transmitter and receiver are both able to accommodate a phase-delay type of activation, thereby permitting the use of a relocated dimmer switching function. FIG. 3A illustrates a transmitter for this embodiment, whereas FIG. 3B presents a schematic diagram for a corresponding receiver. The transmitter of FIG. 3A, includes means 302 for making connection to a switched electrical outlet as described previously with respect to FIG. 1, and means 304 for rectifying the signal if in AC form, such as a full-wave bridge, as shown. Trigger circuit 307 provides a pulse to infrared diode 320, thus radiating a wireless signal, when the input voltage exceeds a threshold indicating turn-on. In the event that the application of power is delayed by phase angle $\alpha$ due to the attachment of a dimmer at connection means 302, the transmitter of FIG. 3A responds to this condition, and simply delays the turn-on of IR diode 320 in accordance with this phase angle.

The receiver for this embodiment, shown in FIG. 3B, includes means 350 for making attachment to a source of power, and a circuit 357 providing bias to IR receiver 364. Upon receipt of an infrared pulse, detector device 364 switches on, causing the gating of a switch, preferably triac 380, thereby activating the load through connection means 386. A gating circuit 372 including a DIAC, example, may be included in the circuit for reliable performance. Since the load through connection means 386 and the pulse receiving components just described are in parallel with the source of power through means 350, as with the circuit of FIG. 2, subsequent pulses may be received to continue the operation of the circuit, including transmissions associated with phase-delay switching. Even though the transmitter and receiver are remotely disposed within a room, assuming the relocated load is not extremely inductive or capacitive in nature, zero crossing of the AC wave should be consistent between the two locations to afford this remote dimming function.

What is claimed is:

1. [Electrical] *An electrical* switched-load relocation apparatus adapted for use with an electrical connection, controlled by a switch, a source of A.C. electrical power, and an electrical load, comprising:

a wireless transmitter module in electrical communication with the electrical connection and the source of A.C. electrical power, the transmitter module being operative to radiate a remote-control signal on a per-cycle basis when the electrical power is applied to the connection through the switch; and a wireless receiver module physically separate from the wireless transmitter module and disposed in an electrical path between the source of A.C. electrical power and the electrical load, the receiver being operative to route power from the source to the load on a per-cycle basis in response to the remote-control signal radiated by the transmitter, thereby enabling the switch to control a relocated load on a delayed-phase basis.

2. The electrical switched-load relocation apparatus as [see] *set* forth in claim 1, wherein the signal radiated by the transmitter is an infrared signal.

3. The electrical switched-load relocation apparatus as set forth in claim 1, wherein the signal radiated by the transmitter is an RF signal.

4. The electrical switched-load relocation apparatus as set forth in claim 1, wherein the signal radiated by the transmitter is an acoustical signal.

5. The electrical switched-load relocation apparatus as set forth in claim 1 including a switched electrical connection associated with an electrical outlet located in the ceiling of a room.

6. The electrical switched-load relocation apparatus as set forth in claim 1 including a switched electrical connection associated with a wall outlet of a room.

7. A system for relocating a switched electrical connection, comprising:

a transmitter module, including:

a threaded base for making electrical contact to a switched electrical socket of the type configured to receive a light bulb with treaded base, and means other than the light bulb for transmitting a wireless signal in response to the application of electrical power to the switched electrical socket;

and a receiver module, including:

means for making electrical contact to a source of electrical power, means for making contact to an electrical load, and means for routing electrical power from the source to the load in response to the signal transmitted by the transmitter module.

8. The system as see forth in claim 7, wherein the transmitter module further includes means for making electrical contact to an electrical load which receives power in response to the application of electrical power to the switched electrical connection.

9. The system as set forth in claim 7 wherein the means for making electrical contact to a source of electrical power includes a set of exposed wires adapted for connection to a corresponding set of exposed wires.

10. The system as set forth in claim 7, wherein the means for making electrical contact to a source of electrical power includes a plug to be inserted into an electrical outlet.

11. The system as set forth in claim 7, wherein the means for making electrical contact to a source of electrical power includes a threaded base to be inserted into an electrical socket.

12. The system as set forth in claim 7, wherein the means for making contact to an electrical load includes an electrical outlet into which a load having a plug may be inserted.

13. The system as set forth in claim 7, wherein the means for making contact to an electrical load includes an electrical socket into which a load having a threaded base may be installed.

14. The system as set forth in claim 7, wherein the means for transmitting a wireless signal in response to the application of electrical power to the switched electrical connection and the means for routing electrical power from the source to the load in response to the wireless signal both function on a per-cycle basis in conjunction with AC power, thereby permitting remote phase-angle control.

*15. In an electrical circuit configuration wherein a source of AC power is routed to an electrical outlet and to a first load associated with a ceiling fixture controlled by a manually operated switch, a method of controlling a second load at the outlet using the switch, comprising the steps of:*

*replacing the first load with a wireless remote transmitter, the transmitter being operative to radiate a control signal in accordance with the setting of the manually operated switch;*

*installing a wireless remote receiver at the outlet, the receiver including an electrically operated switch responsive to the control signal radiated by the transmitter;*

*connecting the second load to the receiver; and*

*controlling the second load using the manually operated switch.*

*16. The method of claim 15, wherein the control signal radiated by the transmitter is an RF, infrared, or acoustical signal.*

*17. The method of claim 15, wherein the transmitter includes a threaded base enabling the transmitter to be screwed into a standard lamp socket.*

*18. The method of claim 15, wherein the transmitter includes a set of prongs enabling the transmitter to be plugged into standard wall outlet.*

*19. The method of claim 15, wherein second load is a light bulb, and the receiver includes:*

*a threaded base enabling the receiver to be screwed into standard lamp socket; and*

*a threaded receptacle to receive the light bulb.*

*20. The method of claim 15, wherein the receiver includes a set of prongs enabling the receiver to be plugged into a standard wall outlet.*

*21. The method of claim 20, wherein the receiver includes an outlet into which the second load can be plugged.*

*22. In an electrical circuit configuration wherein a source of AC power is routed to an electrical outlet and to a first load controlled by a manually operated switch, a method of controlling a second load at the outlet using the switch, comprising the steps of:*

*installing a wireless remote transmitter at the location of the first load, the transmitter being operative to radiate a control signal in accordance with the setting of the manually operated switch;*

*installing a wireless remote receiver at the outlet, the receiver including an electrically operated switch responsive to the control signal radiated by the transmitter;*

*connecting the second load to the receiver module; and*

*dimming the second load using the manually operated switch.*

*23. In an electrical circuit configuration wherein a source of AC power operating on a per-cycle basis is routed to an electrical outlet and to a first load at a ceiling fixture controlled by a manually operated switch, a method of controlling a second load at the outlet using the switch, comprising the steps of:*

*installing a wireless remote transmitter at the ceiling fixture, the transmitter being operative to radiate a control signal in accordance with the setting of the manually operated switch;*

*installing a wireless remote receiver at the outlet, the receiver including an electrically operated switch responsive to the control signal radiated by the transmitter;*

*connecting the second load to the receiver module; and*

*controlling the second load using the manually operated switch.*

*24. The method of claim 23, wherein the control signal radiated by the transmitter is an RF, infrared, or acoustical signal.*

*25. The method of claim 23, wherein the step of installing the transmitter replaces the first load.*

*26. The method of claim 23, wherein the transmitter includes a threaded base enabling the transmitter to be screwed into standard lamp socket.*

*27. The method of claim 23, wherein second load is a light bulb, and the receiver includes:*

*a threaded base enabling the receiver to be screwed into standard lamp socket; and*

*a threaded receptacle to receive the light bulb.*

*28. The method of claim 23, wherein the receiver includes a set of prongs enabling the receiver to be plugged into standard wall outlet.*

*29. The method of claim 28, wherein the receiver includes an outlet into which the second load can be plugged.*

*30. The method of claim 28, wherein the second load is controlled on a per-cycle basis.*

*31. In an electrical circuit configuration wherein a source of AC power operating on a per-cycle basis is routed to a fixture and to a first load, the first load being controlled by a manually operated switch, a method of controlling a second load at the fixture, comprising the steps of:*

*installing a wireless remote transmitter at the first load, the transmitter being operative to radiate a control signal in accordance with the setting of the manually operated switch;*

*installing a wireless remote receiver at the fixture, the receiver including an electrically operated switch responsive to the control signal radiated by the transmitter;*

*connecting the second load to the receiver module; and*

*controlling the second load using the manually operated switch.*

*32. The method of claim 31, wherein the control signal radiated by the transmitter is an RF, infrared, or acoustical signal.*

*33. The method of claim 31, wherein the step of installing the transmitter replaces the first load.*

*34. The method of claim 31, wherein the transmitter includes a threaded base enabling the transmitter to be screwed into a threaded socket.*

*35. The method of claim 31, wherein second load is a light bulb, and the receiver includes:*

*a threaded base enabling the receiver to be screwed into a threaded socket; and*

*a threaded receptacle to receive the light bulb.*

* * * * *